United States Patent

Bauer et al.

[11] Patent Number: 5,096,029
[45] Date of Patent: Mar. 17, 1992

[54] LONGITUDINALLY CONTROLLABLE ADJUSTMENT DEVICE

[75] Inventors: Hans J. Bauer; Hans-Peter Bauer, both of Altdorf, Fed. Rep. of Germany

[73] Assignee: Suspa Compart AG, Altdorf, Fed. Rep. of Germany

[21] Appl. No.: 619,823

[22] Filed: Nov. 29, 1990

Related U.S. Application Data

[63] Continuation of Ser. No. 379,302, Jul. 13, 1989, abandoned.

[30] Foreign Application Priority Data

Jul. 23, 1988 [DE] Fed. Rep. of Germany ....... 3825076

[51] Int. Cl.⁵ ........................... F16F 9/34; A47B 9/10
[52] U.S. Cl. .................... 188/300; 137/270; 251/333; 267/64.12; 277/207 R; 297/355
[58] Field of Search ........... 188/300, 299, 319, 322.13, 188/322.14, 322.15; 267/64.12, 120; 137/269, 270; 251/324, 333; 277/207 R; 297/345, 355

[56] References Cited

U.S. PATENT DOCUMENTS

| | | | |
|---|---|---|---|
| 2,992,817 | 7/1961 | Templeton | 251/324 X |
| 3,656,593 | 4/1972 | Bauer . | |
| 3,913,901 | 10/1975 | Molders | 188/300 X |
| 4,257,582 | 3/1981 | Wirges | 297/34.5 X |
| 4,386,766 | 6/1983 | Bauer et al. | 188/300 X |
| 4,632,228 | 12/1986 | Oster et al. | 188/300 X |
| 4,867,317 | 9/1989 | Wildemann et al. | 267/64.12 |

FOREIGN PATENT DOCUMENTS

| | | |
|---|---|---|
| 0234184 | 3/1987 | European Pat. Off. . |
| 7434101 | 2/1975 | Fed. Rep. of Germany . |
| 7434102 | 3/1975 | Fed. Rep. of Germany . |
| 7434098 | 4/1975 | Fed. Rep. of Germany . |
| 2942455 | 4/1981 | Fed. Rep. of Germany ...... 267/120 |
| 2586771 | 3/1987 | France ................. 188/300 |
| 1219356 | 1/1971 | United Kingdom ................ 251/333 |
| 2197708 | 5/1988 | United Kingdom ................ 188/300 |

Primary Examiner—George A. Halvosa
Attorney, Agent, or Firm—Browdy and Neimark

[57] ABSTRACT

A longitudinally controllable adjustment device, in particular a gas spring partially filled with a fluid, has a piston disposed on a piston rod and a valve, inside of which a valve body is slidable in its longitudinal direction. It has a tapered section by which a seal, abutting on a sealing face, can be bridged. In order to make possible a long-stroke embodiment and a short-stroke embodiment, the seal has two sealing beads, of which the one sealing bead sealingly abuts in all embodiments against a truncated cone-like sealing face of the valve body, while the other sealing bead, if required, abuts on an optionally provided additional cylindrical sealing face between the truncated cone-like sealing face and the tapered section.

4 Claims, 4 Drawing Sheets

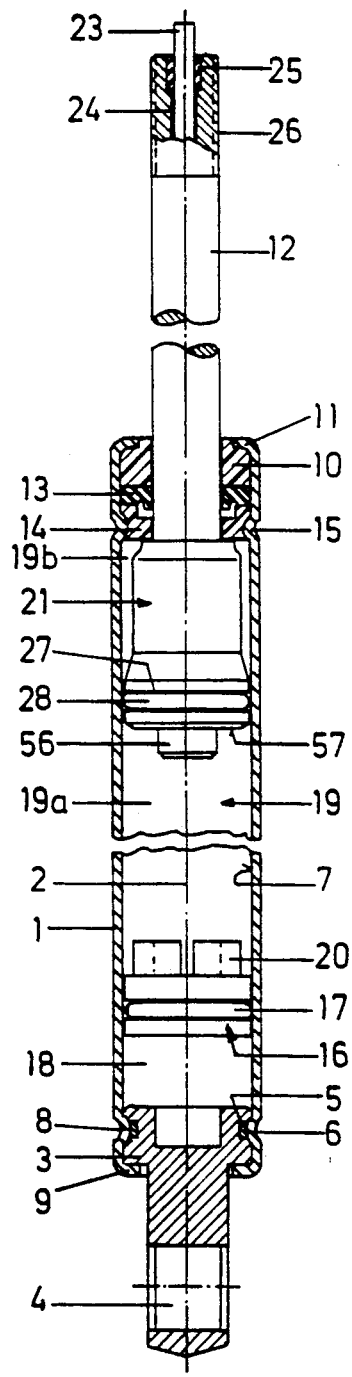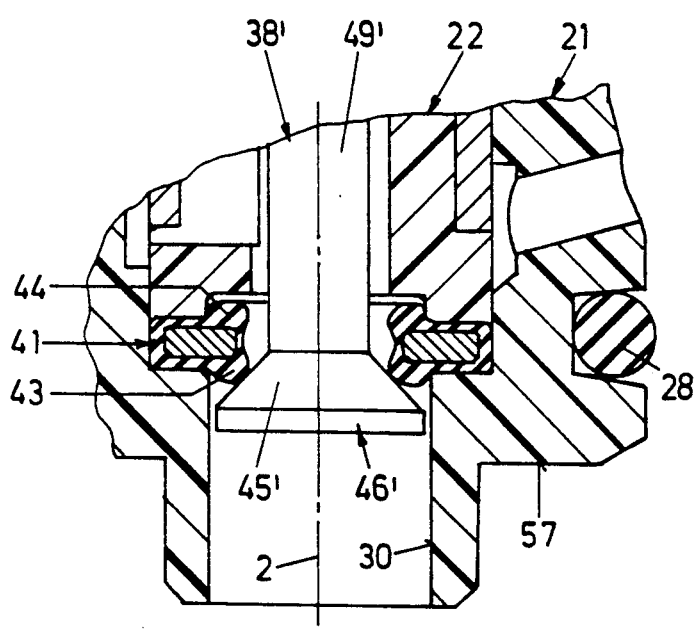

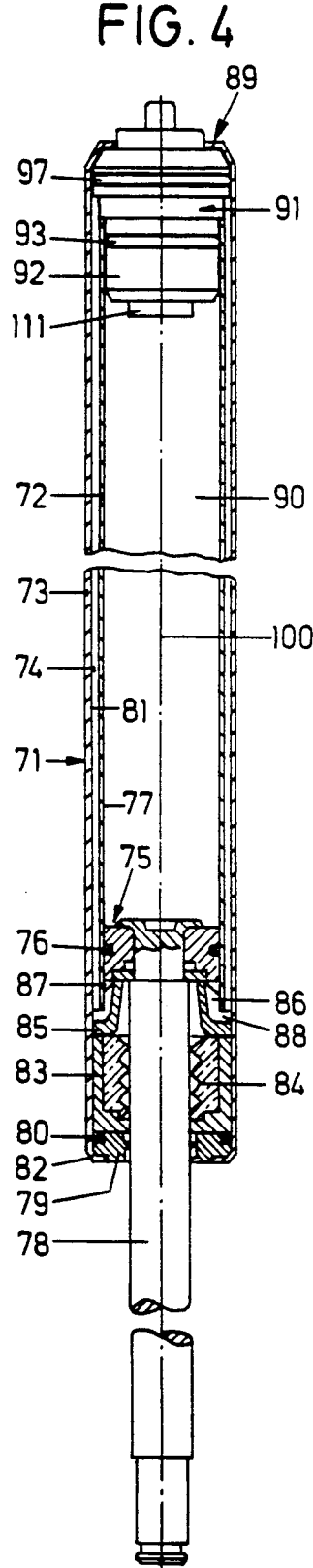
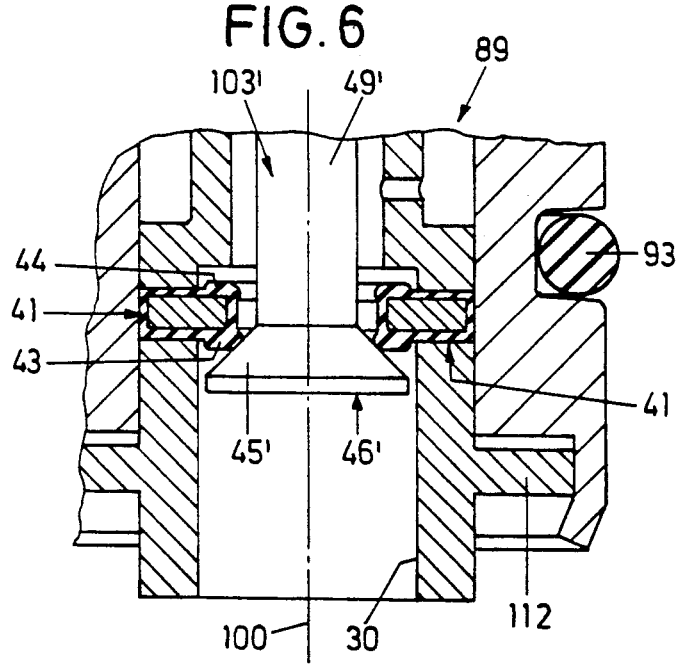

LONGITUDINALLY CONTROLLABLE ADJUSTMENT DEVICE

This application is a continuation of parent co-pending application Ser. No. 07/379,302, filed July 13, 1989, now abandoned without prejudice in favor of the present application.

BACKGROUND OF THE INVENTION

1. Field of the Invention

The invention relates to a longitudinally controllable adjustment device, including a cylindrical housing closed at one end and filled with a pressure medium, a piston rod sealingly extending from the other end of the housing and slidable therein. A piston is disposed in the housing and sealingly guided against the inner wall thereof, which is fixedly connected with the piston rod and slidable together with it and which divides the inner chamber of the housing into two partial chambers. A valve connects or separates the two partial chambers, having a valve body actuable by means of a slidably guided trigger pin and which abuts with one sealing face against a seal and can be slidingly brought into a position bridging the seal by means of a tapering section.

2. The Prior Art

There are two basic groups of such adjustment devices. The one group is known, for example, from German Utility Models DE-GM 74 34 098, DE-GM 74 34 102, DE-GM 74 34 101 and DE-GM 86 01 132 (corresponding to Published, Non-Examined European Patent Application EP-OS 0 234 184). In this group of adjustment devices the valve is disposed in the piston. In the other group of adjustment devices, as for example known from U.S. Pat. No. 3,656,593, the valve is disposed in that end of the housing which is opposite the side where the piston rod exits. Both types of adjustment devices are at least partially filled with gas, by means of which the piston rod can be pushed out of the housing or it can be pushed back in against the force of its pressure, when the valve is opened. If the piston itself is slidable in a fluid-filled chamber, then a complete, i.e., for all practical purposes rigid, arrestment of this adjustment device, which can also be called a gas spring, becomes possible. If, however, the entire housing is filled with pressure gas, a spring potential having a very steep distance/force line is possible, even with the valve closed. Depending on the design, the valve can be either a so-called short-stroke valve or a so-called long-stroke valve. With a so-called short-stroke valve the trigger pin needs to be moved in its longitudinal direction only by a very short distance, for example, from a few tenths of a millimeter up to 1 or 2 mm, while with a long-stroke valve the trigger pin must be moved by at least several millimeters, for example 3 to 6 mm, before the valve opens. For these purposes the valves must be basically differently designed and manufactured.

SUMMARY OF THE INVENTION

It is an object of the invention to provide the adjustment devices stipulated according to the species in such a way that it becomes possible to optionally attain either a short-stroke valve or a long-stroke valve with only small manufacturing changes.

This object is attained by means of the present invention, in which the seal has two sealing beads projecting radially inward and axially free, one sealing bead of the two abuts on truncated cone-like sealing face of the valve body and the other sealing bead of the two abuts, if required, on a cylindrical sealing face of the valve body adjoining the truncated cone-like sealing face.

By means of the structure in accordance with the invention in particular that of the seal, the seal always abuts with a sealing bead on a sealing face in the shape of a truncated cone which is present in the long-stroke construction and in the short-stroke construction. If this truncated cone-like sealing face alone is present, i.e., if the tapered section immediately abuts on this truncated cone-like sealing face, then this is a short-stroke construction. If, however, a cylindrical sealing face immediately adjoins the truncated cone-like sealing face on which, in turn, the tapered section of the valve body abuts, then this is a long-stroke construction, because the other sealing bead of the seal abuts on the cylindrical section. In this case an axial displacement across the entire length of the cylindrical sealing face is required during opening of the valve.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

Further details, advantages and characteristics of the invention ensue from the following description of two exemplary embodiments by means of the drawings, in which:

FIG. 1 shows a vertical longitudinal section of a longitudinally controllable adjustment device in accordance with the invention;

FIG. 3 shows a partial section of the piston with the valve having a valve body different from the one in FIG. 2;

FIG. 4 shows a further embodiment of a longitudinally controllable adjustment device in accordance with the invention in vertical cross section;

FIG. 6 shows a partial section of the valve with a valve body different from the one in FIG. 5.

DETAILED DESCRIPTION OF THE PREFERRED EMBODIMENTS

Figure 2:
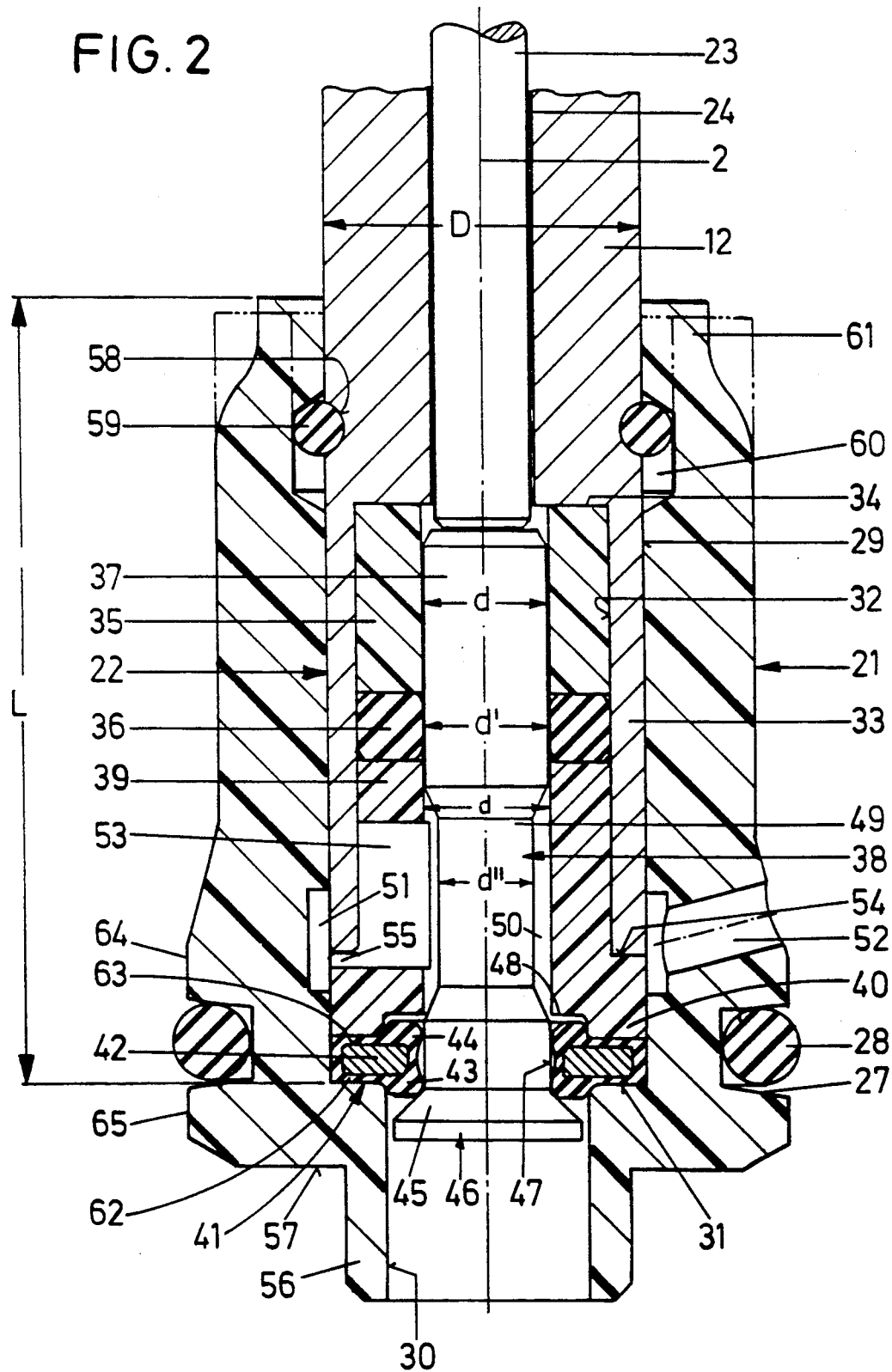
FIG. 2 shows the piston with the valve of the adjustment device of FIG. 1 in longitudinal section in a greatly enlarged scale.

The adjustment device shown in the drawings is in the form of a rigidly arrestable gas spring. It has a cylindrical housing 1 made, for example, out of a steel pipe, having a center longitudinal axis 2. The housing 1 is closed at one end by means of a plug closure 3 on which a so-called eye is disposed as fastening member 4. At its circumference the plug closure 3 has a groove 5 in which an O-ring-shaped seal 6 is disposed, which sealingly abuts on the inner wall 7 of the housing 1. The plug closure 3 is fixed in relation to the housing 1 in the direction of the axis 2 by the housing having a bead 8 pressed against the seal 6 and into the groove 5. Furthermore, the associated end of the housing 1 is provided with a bead 9 grasping the plug closure 3 from the outside.

The other end the housing 1 is provided with a guide bush 10 disposed concentrically to the axis 2, which is also grasped on its outside by a bead 11 of the housing 1. Inside the guide bush 10, a piston rod 12, disposed concentrically to the axis 2 and extending from the housing, is guided slidably in its longitudinal direction. An annular seal 13 is supported against the guide bush 10, which on one side sealingly adjoins the inner wall 7 of the housing 1 and on the other side the piston rod 12. The seal 3, in turn, is maintained by a support ring 14 axially to the interior of the housing 1, which is axially fixed by means of a bead 15 pressed into the housing 1.

The housing 1 is closed on both of its ends sealed against gas and liquid by the steps described. A separating piston 16, slidable in the direction of the axis 2, is disposed inside the housing 1, which tightly adjoins the inner wall 7 of the housing by means of an O-ring-shaped seal 17. Between the separating piston 16 and the plug closure 3, a gas chamber 18 filled with a gas under pressure is formed, which is sealed against inflow of air and the liquid from the housing chamber serving as liquid chamber 19 between the separating piston 16 and the seal 13. Spacers 20 are provided on the separating piston 16 in the liquid chamber 19.

At the inner end of the piston rod 12 located inside the liquid chamber 19, a piston 21 with an integrated valve 22 is disposed. The valve 22 is operated from the outside by means of a trigger pin 23 in the shape of a thin bar, which is disposed in a bore 24 in the piston rod 2 extending concentrically to the axis 2. At the outer end of the piston rod 12 a seal 25 is disposed, which prevents the entry of dirt into the bore 24 and thus into the area of the valve 22 and which simultaneously serves as a kind of friction brake by means of which unintentional falling out of the trigger pin 23 out of the bore 24 is prevented. The piston rod 12 is furthermore provided at this outer end with an outer thread 26, to which can be attached a fastening device, not shown.

The piston 21 is provided with a groove 27 on its exterior, in which an O-ring-shaped seal 28 is disposed which sealingly abuts on the inner wall 7 of the housing 1. It divides the liquid chamber 19 into two partial liquid chambers 19a and 19b, the partial liquid chamber 19a extending between the seal 28 and the separating piston 16 and the partial liquid chamber 19b extending between the seal 28 and the seal 13.

The piston 21 is designed in the shape of a sleeve. It has a receptacle 29, cylindrical to the axis 2, for the piston rod 12. The piston rod 12 is maintained without radial play in this receptacle 29. The receptacle 29 has a conduit-like opening 30 which ends in the partial liquid chamber 19a and is in the shape of a bore concentric to the axis 2. Between the receptacle 29 and the opening 30, an annular bottom 31 of the receptacle 29 is formed.

On its end located inside the piston 21, the piston rod 12 is provided with a cylindrical bore 32 coaxial to the axis 2; the wall remaining in this area forms a valve housing 33 with an annular bottom 34 extending radially to the axis 2. An annular cylindrical guide bush 35 abutting on the bottom 34 has been inserted into this valve housing 33. On the side facing away from the bottom 34, an O-ring-shaped seal 36 abuts on the guide bush 35, which sealingly adjoins on one side the valve housing 33 and on the other a cylindrical guide section 37 of a valve body 38. In turn, a support and guide bush 39 abuts against the seal 36, which grasps the valve housing 33 with an outwardly extending annular collar 40, i.e., is axially fixed against the piston rod 12. The inner diameters d of the guide bush 35 and of the support and guide bush 39 are identical and are only larger by the required guidance play d' of the cylindrical guide section 37 of the valve body 38, which is guided in the guide bush 35 and the support and guide bush 39, as can be seen in FIG. 2.

A seal 41 is disposed between the annular collar 40 and the annular bottom 31. It has an interior ring 42, which is used for stabilization and made of a rigid material, such as a metal or a sufficiently hard plastic. The seal 41 sealing adjoins on one side the receptacle 39, and on the other side the annular bottom 31 and the annular collar 40 opposite it. On its side located radially in its interior, the seal 41 is provided with axially and radially protruding rounded sealing beads 43, 44. The rounded sealing bead 43 abuts on a sealing face 45, widening in the shape of a truncated cone, of a valve disk 46 of the valve body 38 located in the opening 30. Additionally, this rounded sealing bead 43 abuts on a cylindrical sealing face 47 of the valve body 38 joining the truncated cone-like sealing face 45. The other rounded sealing bead 44, located towards the interior of the valve 22, only abuts against this cylindrical sealing face 47 in the embodiment in accordance with FIG. 2. The sealing bead 43 extends beyond the annular bottom 31 radially inwards into the conduit-like opening 30, while the other sealing bead 44 extends, without axial guidance, into an undercut 48 of the annular collar 40; thus the sealing beads 43, 44 are axially not compressed.

A section 49, tapered with respect to the cylindrical sealing face 47 and the guide section 37, immediately follows the cylindrical sealing face 47, the outer diameter d" of which is noticeably smaller than the inner diameter d of the support and guide bush 39, so that an overflow chamber 50 is formed between these two. The transition from the sealing face 47 to the section 49 can be abrupt or take place via a truncated cone surface, as shown in the drawings.

In the receptacle 29, in the area of the transition between the valve housing 33, i.e., the piston rod 12 and the annular collar 40, an annular conduit 51 is formed and which therefore is partially covered or closed towards the inside by the valve housing 33 and the annular collar 40. This annular conduit 51 is connected via an overflow opening 52 with the partial liquid chamber 19b.

A slit-like opening 53 is formed radially opposite the overflow opening 52 in the support and guide bush 39 and extends parallel to the axis 2. In the front end 54 of the valve housing 33, a throttle opening 55 is associated with it, which is open towards the annular conduit 51. Thus liquid can flow from the partial liquid chamber 19b via the conduit-like overflow opening 52, formed by a bore, into the annular conduit 51 and then, on the diametrically opposite side, through the throttle opening 55 and the opening 53 into the overflow chamber 50. Naturally, the flow can also be in the opposite direction.

If, by pressing the trigger pin 23 into the piston rod 12, the valve body is displaced in the direction towards the partial liquid chamber 19a, the tapered section 49 is placed in front of the seal 41, the sealing beads 43, 44 of which, because of the relatively smaller diameter d" do not sealingly adjoin the tapered section 49. In this case liquid can flow out of the overflow chamber 50 along the inside of the seal 41 into the opening 30 and from there into the partial liquid chamber 19a or in the reverse direction.

During these displacements moves the valve disk 46 remains in the conduit-like opening 30, which extends beyond the front face 57 of the piston 21 forming a protective pipe 56. If, in a borderline case, with the piston rod 12 completely pushed in, the piston 21 meets the separation piston 16, the spacers 20 come into contact with the front face 57, so that even then liquid can flow freely into the opening 30 or out of the opening 30. Because of the diametrical disposition of the overflow opening 52 and the throttle opening 55, satisfactory sound damping is achieved. The placement of the throttle opening 55 in the front face 54 of the valve housing 33, which has been formed out of the piston rod 12, allows in a very simple manner the exact design of the cross section of the throttle opening 55 which, in any case, is considerably smaller than the cross sections of the opening 53, the overflow opening 52 and the annular conduit 51, so that throttling takes place only in this throttle opening 51 almost exclusively.

The piston 21 is fixed with its end facing away from its front face 57 on the piston rod 12 in the area behind the valve housing 33. Here the piston rod 12 has an annular groove 58 with a graduated circle cross section, into which a securing ring 59 with a circular cross section is inserted. The piston 21 is provided on its open side opposite the annular bottom 31 in the non-compressed state with a bore 60 extending coaxially to the axis 2. The shape of the piston 21 in this area in the non-worked state is shown in FIG. 2 with a line of dashes and double periods. After assembling the valve and the piston in the manner described above, the piston is compressed in the area of this bore 60 in the direction of the piston rod 12. It then axially adjoins the securing ring 59 and, in its exterior end area, the piston rod with its tapered section 61. In the course of this compression, the piston 21 is axially stressed against the valve 22, the seal 41 being axially compressed between the annular bottom 31 and the annular collar 40. Because the ring 42 of the seal 41 is rigid per se, only the relatively thin sealing faces 62, 63, which abut on the annular bottom 31 or the annular collar 40, can be compressed. In the uncompressed state these sealing faces 62, 63 have a thickness of a few tenths of a millimeter, e.g. 0.3 to 0.6 mm. To allow deformation, the piston 21 consists of a suitable light metal alloy or a suitable thermally deformable plastic.

As can be seen from FIG. 2, the total length L of the receptacle 29 is large in comparison to the exterior diameter D of the piston rod 12. It is approximately twice to four times the size, the size in particular approximately three times greater. Because of this, there is no tilting of the piston rod 12 in relation to the seal 28, so that perfect guidance of the piston 21 with it two guide faces 64, 65 located on both sides of the seal 28 along the inner wall 7 of the housing 1 is assured. Furthermore, no tilting in relation to the seal 41 is possible so that, in spite of the very thin design of the sealing faces 62, 63, perfect sealing is assured.

A partial section of the piston 21 with the valve 22 is shown in FIG. 3, which differs from the embodiment according to FIG. 2 only in that the tapered section 49' of the valve body 38' extends as far as the truncated cone-like sealing face 45' of the valve disk 46'. In this case the seal 41 lies against the sealing face 45' with only its one sealing bead 43 which faces towards the opening 30. The other sealing bead 44 is without function regarding the valve body 38'. In this embodiment the valve 21 is already open when the trigger pin 23 and thus the valve body 38' are only slightly displaced in the direction of the axis 2, for example by less that a millimeter, because the lifting of the sealing face 45' from the sealing bead 43 is already sufficient to open the valve. In contrast, in the embodiment in accordance with FIG. 2, for opening the valve the valve body 38 must be displaced sufficiently far in the direction of the axis 2 that the cylindrical sealing face 47 is out of contact with both sealing beads 43, 44. Thus, the opening stroke is some millimeters.

Because the fluid chamber 19 is filled with fluid, the adjustment device is completely blocked when the valve 22 is closed.

The longitudinally controllable gas spring shown in FIG. 4 has a housing 71 which in general comprises two tubes placed concentrically one inside the other and which have different diameters, namely a n interior cylinder 72 and an exterior cylinder 73. Between the interior cylinder 72 and the exterior cylinder 73, an annular space 74 is formed because of the differing diameters of the interior cylinder 72 and the exterior cylinder 73.

In the interior cylinder 72 an approximately annular piston 75 is disposed axially displaceable and is sealed gas-tight with its outer circumference against the inner wall 77 of the interior cylinder 72 by means of a sealing ring 76. The piston 75 is fixed to one end of a piston rod 78 which extends coaxially to the housing 71. This piston rod 78 extends through one end of the housing 71. At this end, the housing 71 is sealed by a closure disk 79 which is sealed gas-tight at its outer circumference against the inner wall 81 of the exterior cylinder by means of an annular seal 80. The closure disk 79 is supported axially towards the outside by a bead 82 of the exterior cylinder 73. On the inside a cup-shaped sleeve 83 abuts on the closure disk 79, which contains a multiple lip seal 84 sealingly abutting with its lips on the piston rod 78. This prevents a gas discharge to the outside along the surface of the piston rod 78.

From the inner chamber of the housing 71, a centering member 85 adjoining the inner wall 8 of the exterior cylinder 73 is supported against the sleeve 83 and is provided with ribs 86, on which the interior cylinder 72 is radially supported with its inner wall 77, i.e., is centered. The interior cylinder 72 is also axially firmly supported on these ribs 86, i.e., it is unilaterally axially fixed. Because only ribs 86 have been provided for the centering and axial support of the interior cylinder 72, the annular chamber 74 is connected in this area with the housing chamber 87 in the interior cylinder 72, which is defined between the piston 75, the end of the housing 71 where the piston rod exits and the inner wall 77 of the interior cylinder 72. Thus, between the ribs 86 there are overflow conduits 88 formed between the housing chamber 87 and the annular chamber 74.

At the end of the housing 71 opposite from where the piston rod emerges, a valve 89 is disposed, by means of which the housing chamber 90, located in the interior cylinder 72 between the piston 75 and the valve 89, can be connected with or separated from the annular chamber 74 and thus the other housing chamber 87.

The valve 89 has a valve housing 91 comprising a plurality of cylindrical sections. It has a cylindrical section 92, the outside diameter of which corresponds to the inside diameter of the interior cylinder 72 and which is radially fixed in it. A gas-tight seal between the cylindrical section 92 and the inner wall 77 of the interior cylinder 72 is achieved by means of an O-ring seal 93 disposed in an annular groove 94 of the cylindrical section 92. The valve housing 91 is axially fixed by means of an annular collar 95 with respect to the interior cylinder 72. The valve housing has a further cylindrical section 96, the outside diameter of which corresponds to the inside diameter of the exterior cylinder 3 and which abuts on the inner wall 81 of the exterior cylinder 73 without radial play, a gas-tight seal being achieved here by means of an O-ring seal 97 disposed in an annular groove 98 of this cylindrical section 96. The exterior cylinder 73 is flanged around the valve housing 91. Because of this flange 99, the interior cylinder 72 and the exterior cylinder 73, the valve housing 91 and the parts located in the area of the piston rod exit are axially interconnected. The entire adjustment device in the form of a gas spring is designed axially symmetrical to a center longitudinal axis 100.

A guide bore 101 is formed coaxially to the axis 100, in which a guide section of a valve body 103, serving as a trigger pin 102, is disposed movable in the direction of the axis 100 and extends out of the guide bore 101 of the valve housing 91 towards the outside. In the area of the inner end of the guide bore 101 an annular groove 101 is formed, in which an O-ring seal 105 is disposed, which forms a gas-tight seal between the guide bore 101 of the valve housing 91 and the trigger pin 102.

A cylindrical bore 106 is connected to the guide bore 101 with its annular groove 104 in the direction of the housing chamber 90 in which a retaining bush 107 is located, which abuts on the bottom 108 of the blind bore-like bore 106 and thus simultaneously maintains the seal 105 in the annular groove 104. A seal 41, identical to the seal 41 described in the exemplary embodiments according to FIGS. 1 to 3 and which therefore does not need to be described again, abuts on an annular collar 109 of the retaining bush 107 located opposite the bottom 108. Reference is made to the description above. This seal 41 abuts on a front side 110 of a support sleeve 111 which is inserted into a cylindrical bore 106 from the side oriented towards the housing chamber 90. This support sleeve 111 has a radially extending fastening flange 112 which projects into a recess 113 placed ahead in the direction of the housing chamber 90 of the bore 106 and is laterally defined by an annular land 114. The fastening flange 112 and, along with it, the support sleeve 111, is pushed in the direction of the bottom 108 of the bore 106 by the creation of a bead 115, which radially grips the fastening flange 112 towards the inside. Because of this, the seal 41 is fixed between the annular collar 109 of the retaining bush 107 and the front side 110 of the support sleeve 111. Additionally, the retaining bush 107 and the support sleeve 111 are axially fixed. The sealing face 62 of the seal 41 comes into contact with the front side 110, and the sealing face 63 into contact with the annular collar 109. The sealing bead 44 extends into an undercut 116 at the annular collar 109 of the retaining bush 107.

Below the trigger pin 102, the valve body 103 is designed identical to the valve body 38 of the exemplary embodiment in accordance with FIG. 2, so that the same reference numerals are being used for the several components. The cooperation between the seal 41 and the valve body 103 is also identical to the exemplary embodiment in accordance with FIG. 2, therefore reference is made to the above descriptions. The overflow chamber 50 between the tapered section 49 of the valve body 103 and the retaining bush 107 is connected with an annular conduit 118 in the form of an opening 117, for example, a bore, between the retaining bush 107 and the bore 106. This annular conduit 118 is, in turn, connected by means of an overflow opening 119 with the annular chamber 74.

Figure 5:
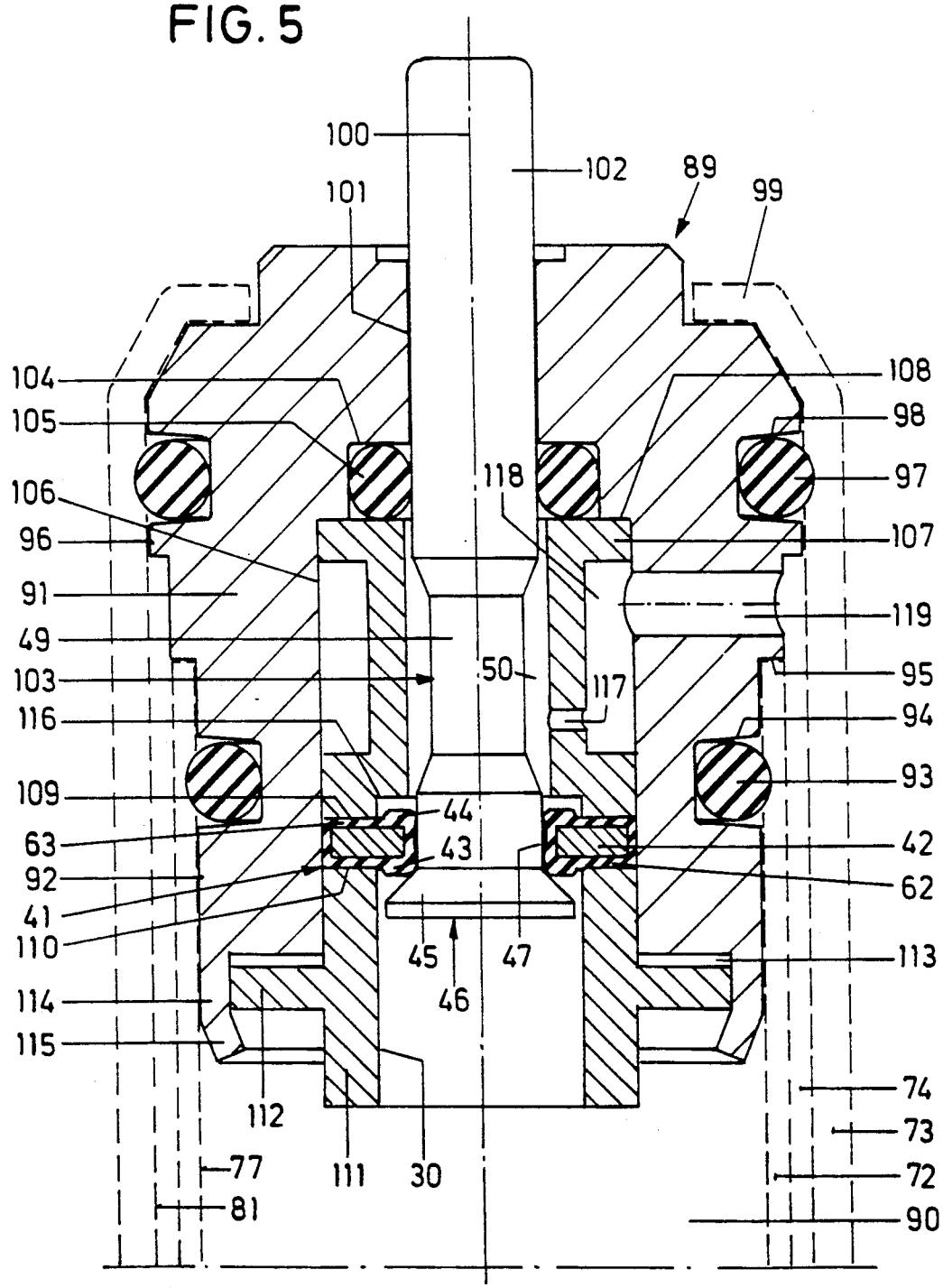
FIG. 5 shows the valve of the adjustment device in accordance with FIG. 4 in a greatly enlarged scale.

In FIG. 6 a partial section of the valve 89 is shown, which differs from the exemplary embodiment in accordance with FIG. 5 only in that the tapered section 49' of the valve body 103'—the same as in the exemplary embodiment according to FIG. 3—extends up to the truncated cone-shaped sealing face 45' of the valve plate 46'. In this case, the seal 41 abuts on the sealing face 45' only with its sealing bead 43 oriented towards the opening 30. The other sealing bead 44 is without function as far as the valve body 103' is concerned. The function is the same as in the embodiment in accordance with FIG. 3.

In this embodiment in accordance with FIGS. 4 and 5 or 6, when the valve 89 is opened, the fluid in the housing chambers 87, 90 flows in a basically known manner, as described above, through the valve 89 and the annular chamber 74 and the overflow conduit 88 or in the reverse direction.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A longitudinally controllable adjustment device, comprising:
  a cylindrical housing closed at one end and filled with a pressure medium;
  a piston rod sealingly extending from the other end of the housing and slidable therein;
  a piston disposed in the housing and sealingly guided against an inner wall thereof, the piston being fixedly connected with the piston rod and slidable together with the piston rod and which divides the inner chamber of the housing into two partial chambers;
  a valve for connecting or separating the two partial chambers comprising a slidable valve body actuable by means of a slidably guided trigger pin between a closed position wherein a sealing face of said valve body abuts against a seal and an open position wherein a tapering section of said valve body bridges the seal so as to leave a fluid flow path between said seal and said tapering section; and
  wherein said seal comprises first and second rounded sealing beads projecting radially inwardly, said first and second rounded sealing beads being axially unsupported, said first rounded sealing bead abutting a truncated cone-like shaped portion of said sealing face of the valve body and said second rounded sealing bead abutting on a cylindrical sealing surface of the valve body adjoining said sealing face having a truncated cone-like shape.

2. An adjustment device in accordance with claim 1, wherein the tapering section adjoins a cylindrical sealing face.

3. An adjustment device in accordance with claim 1, the seal has an interior stabilizing ring.

4. An adjustment device in accordance with claim 2, wherein the seal has an interior stabilizing ring.

* * * * *